US011853175B2

(12) United States Patent
Murata (10) Patent No.: US 11,853,175 B2
(45) Date of Patent: Dec. 26, 2023

(54) CLUSTER SYSTEM AND RESTORATION METHOD THAT PERFORMS FAILOVER CONTROL

(71) Applicant: Hitachi, Ltd., Tokyo (JP)

(72) Inventor: Yoshihiro Murata, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 17/903,377

(22) Filed: Sep. 6, 2022

(65) Prior Publication Data

US 2023/0229572 A1    Jul. 20, 2023

(30) Foreign Application Priority Data

Jan. 17, 2022  (JP) ................. 2022-005206

(51) Int. Cl.
*G06F 11/20*    (2006.01)
*G06F 17/10*    (2006.01)

(52) U.S. Cl.
CPC .......... *G06F 11/2007* (2013.01); *G06F 17/10* (2013.01); *G06F 2201/85* (2013.01)

(58) Field of Classification Search
CPC ... G06F 11/2007; G06F 17/10; G06F 2201/85
See application file for complete search history.

(56) References Cited

U.S. PATENT DOCUMENTS 6,728,896 B1 *  4/2004  Forbes .................. G06F 11/203
  714/11

7,124,320 B1 *  10/2006  Wipfel .................. G06F 11/203
  714/E11.073
10,083,100 B1 *  9/2018  Agetsuma ........... G06F 11/2094
(Continued)

FOREIGN PATENT DOCUMENTS

JP   2000-339186 A   12/2000
JP   2004-046474 A    2/2004
(Continued)

OTHER PUBLICATIONS

Japanese Office Action received in corresponding Japanese Application No. 2022-005206 dated Sep. 5, 2023.

*Primary Examiner* — Matthew M Kim
*Assistant Examiner* — Indranil Chowdhury
(74) *Attorney, Agent, or Firm* — Mattingly & Malur, PC (57) ABSTRACT

A cluster system including a plurality of nodes, a plurality of clusters included in each node and a management module managing the cluster system and an arithmetic module, which are included in each of the clusters, wherein, among all the management modules included in the cluster system, one management module is set representative management module, in the individual clusters, one is set as a master management module, and another is set as a standby management module. Each of the management modules includes a failure monitoring unit and a failover control unit. When a failure in the representative management module is detected by any of the failure monitoring units, any of the management modules included in the non-representative management modules, is set as a new representative management module. A recovery unit restores the failure monitoring unit and the failover control unit in the management module in which a failure is detected.

7 Claims, 6 Drawing Sheets

(56) References Cited

U.S. PATENT DOCUMENTS

| | | | |
|---|---|---|---|
| 10,454,754 B1* | 10/2019 | Patel | H04L 41/0654 |
| 11,681,566 B2* | 6/2023 | Karnawat | G06F 9/5088 |
| | | | 714/4.11 |
| 2002/0184241 A1* | 12/2002 | Wu | G06F 11/0727 |
| 2005/0154697 A1* | 7/2005 | Altaf | G06F 16/27 |
| 2006/0023627 A1* | 2/2006 | Villait | G06F 11/2025 |
| | | | 370/222 |
| 2007/0130220 A1* | 6/2007 | Baba | G06F 11/2025 |
| 2008/0162983 A1* | 7/2008 | Baba | G06F 11/0712 |
| | | | 714/3 |
| 2010/0064165 A1* | 3/2010 | Kambara | G06F 11/2028 |
| | | | 714/E11.055 |
| 2013/0139178 A1* | 5/2013 | Hu | G06F 9/54 |
| | | | 719/313 |
| 2014/0250320 A1* | 9/2014 | Nyuunoya | G06F 11/2038 |
| | | | 714/4.11 |
| 2015/0121134 A1* | 4/2015 | Wipfel | G06F 11/2094 |
| | | | 714/6.31 |
| 2015/0169411 A1* | 6/2015 | Kalman | G06F 3/0619 |
| | | | 714/4.12 |
| 2015/0254143 A1* | 9/2015 | Onishi | G06F 11/2092 |
| | | | 714/19 |
| 2016/0292056 A1* | 10/2016 | Kulli | G06F 11/2094 |
| 2017/0024285 A1* | 1/2017 | Bell | G06F 11/3447 |
| 2018/0276251 A1* | 9/2018 | Srinivasan | G06F 16/27 |
| 2019/0087181 A1 | 3/2019 | Okada et al. | |
| 2019/0272222 A1* | 9/2019 | Wei | G06F 3/0611 |
| 2021/0042045 A1 | 2/2021 | Tatara | |
| 2021/0081287 A1* | 3/2021 | Koning | G06F 11/2094 |
| 2022/0206910 A1* | 6/2022 | Vaideeswaran | G06F 11/2007 |
| 2022/0334725 A1* | 10/2022 | Mertes | G06F 16/275 |
| 2023/0229330 A1* | 7/2023 | Miwa | G06F 3/061 |
| | | | 711/154 |
| 2023/0236940 A1* | 7/2023 | Zakharkin | G06F 11/2092 |
| | | | 714/4.11 |

FOREIGN PATENT DOCUMENTS

| | | | | |
|---|---|---|---|---|
| JP | 2019-053587 A | | 4/2019 | |
| JP | 2021-026659 A | | 2/2021 | |
| WO | WO-2021113488 A1 * | | 6/2021 | G06F 11/1453 |

* cited by examiner

| MODULE NUMBER | NODE NUMBER | STATE | REPRESENTATIVE FLAG | IP ADDRESS |
|---|---|---|---|---|
| 1 | 1 | MASTER | 1 | 192.168.0.1 |
| 2 | 1 | STANDBY | 0 | 192.168.0.12 |
| 3 | 2 | MASTER | 0 | 192.168.0.13 |
| 4 | 2 | STANDBY | 0 | 192.168.0.14 |

MANAGEMENT TABLE 41
411 412 413 414 415

CLUSTER SYSTEM AND RESTORATION METHOD THAT PERFORMS FAILOVER CONTROL

CROSS-REFERENCE TO RELATED APPLICATION

The present application claims priority from Japanese application JP 2022-005206, filed on Jan. 17, 2022, the contents of which is hereby incorporated by reference into this application.

BACKGROUND OF THE INVENTION

1. Field of the Invention

The present invention relates to a cluster system and a restoration method.

2. Description of the Related Art

As a method for implementing a large-scale system, there is known a configuration in which a plurality of apparatuses are operated in cooperation with each other. Japanese Patent Application Publication No. 2019-53587 discloses a storage system that includes a management processor and a plurality of main processors. In this storage system, each of the plurality of main processors alternately switches between a period in which main function processing including I/O processing in response to an I/O request from a host is performed and a period in which a management instruction is executed. In addition, the management processor manages information associating uncompleted management instructions that have been transmitted to the plurality of main processors with destination main processors to which the uncompleted management instructions have been transmitted, selects, from the plurality of main processors, a destination main processor to which a next management instruction is to be transmitted, based on the uncompleted management instructions transmitted to the plurality of main processors, and transmits the next management instruction to the destination main processor.

PATENT LITERATURE

PTL1: Japanese Patent Application Publication No. 2019-53587

SUMMARY OF THE INVENTION

The invention described in Japanese Patent Application Publication No. 2019-53587 cannot handle occurrence of a failure.

According to the 1st aspect of the present invention, a cluster system including a plurality of nodes, the cluster system including a plurality of clusters included in each of the nodes and a management module managing the cluster system and an arithmetic module constituting an arithmetic system, which are included in each of the clusters, wherein, among all the management modules included in the cluster system, one of the management modules is set as a representative management module, in the individual clusters, one of the management modules is set as a master management module, and another one of the management modules is set as a standby management module, and each of the management modules includes a failure monitoring unit that monitors occurrence of a failure in the other one of the management modules, a failover control unit that sets, when a failure in the representative management module is detected by any of the failure monitoring units, any of the management modules included in non-representative management modules, which are management modules excluding the representative management module from all the management modules, as a new representative management module, and a recovery unit that restores the failure monitoring unit and the failover control unit in the management module in which a failure is detected by any of the failure monitoring units.

According to the 2nd aspect of the present invention, a restoration method performed by a cluster system including a plurality of nodes, the cluster system including a plurality of clusters included in each of the nodes, and a management module managing the cluster system and a storage module constituting an arithmetic system, which are included in each of the clusters, wherein, among all the management modules included in the cluster system, one of the management modules is set as a representative management module, and in the individual clusters, one of the management modules is set as a master management module, and another one of the management modules is set as a standby management module, the restoration method comprising causing each of the management modules to perform a failure monitoring process for monitoring occurrence of a failure in the other one of the management modules, perform a failover process for setting, when a failure in the representative management module is detected by the failure monitoring process in any of the management modules, any of the management modules included in non-representative management modules, which are management modules excluding the representative management module from all the management modules, as a new representative management module, and perform a recovery process for restoring a program that realizes the failure monitoring process and the failover process in the management module in which a failure is detected by the failure monitoring process in any of the management modules.

According to the present invention, when a failure occurs in a management module, the management module can be restored without manual intervention.

DESCRIPTION OF THE PREFERRED EMBODIMENTS

Embodiment 1

Hereinafter, Embodiment 1 of a cluster system according to the present invention will be described with reference to FIGS. 1 to 6.

Figure 1:
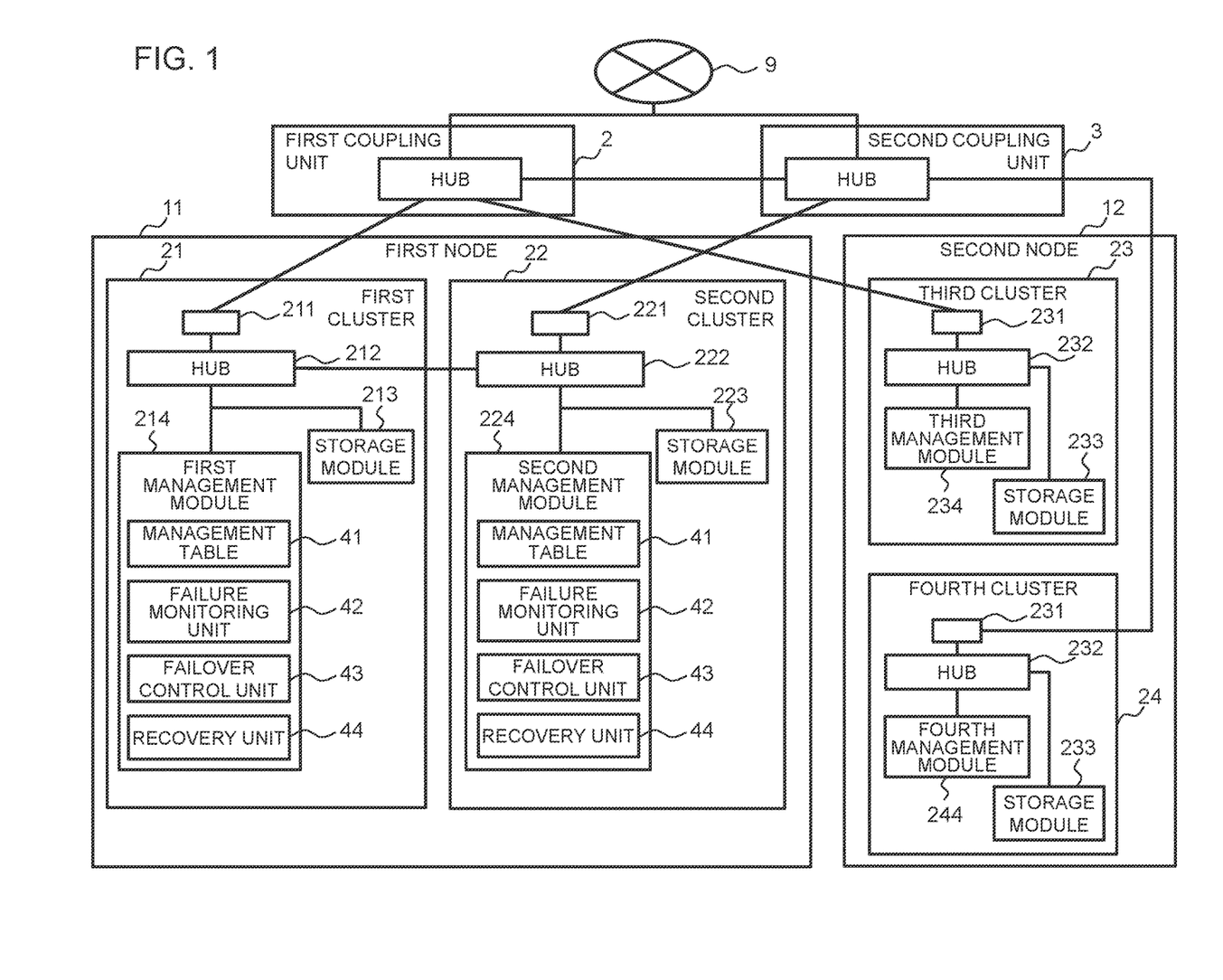
FIG. 1 is a diagram illustrating an overall configuration of a cluster system.

FIG. 1 is a diagram illustrating an overall configuration of a cluster system 1. The cluster system 1 provides a storage system via a network 9. The cluster system 1 includes a first node 11 and a second node 12. The first node 11 and the second node 12 have approximately the same configuration. The first node 11 includes a first cluster 21 and a second cluster 22. The second node 12 includes a third cluster 23 and a fourth cluster 24. The first cluster 21, the second cluster 22, the third cluster 23, and the fourth cluster 24 have approximately the same configuration. Therefore, the configuration and operation of the first cluster 21 will mainly be described below.

The cluster system 1 further includes a first coupling unit 2 and a second coupling unit 3 that couple the cluster system 1 to the network 9. The first coupling unit 2 and the second coupling unit 3 are hubs, for example, switching hubs. The first coupling unit 2 is coupled to the network 9, the first cluster 21, the third cluster 23, and the second coupling unit 3. The second coupling unit 3 is coupled to the network 9, the second cluster 22, the fourth cluster 24, and the first coupling unit 2.

The first cluster 21 includes a port 211, a hub 212, a storage module 213, and a first management module 214. The port 211 is coupled to the first coupling unit 2 and the hub 212. The port 211 is, for example, a network interface card including a plurality of coupling ports, and an identifier on the network, for example, a predetermined IP address can be set in at least the port coupled to the first coupling unit 2. The IP address to be set in this port is designated by the first management module 214 via the hub 212. Since the IP address of this port is used for access from the network 9, hereinafter, the IP address is also referred to as an "external IP address".

The hub 212 is, for example, a switching hub. The hub 212 is coupled to the port 211, the storage module 213, the first management module 214, and a hub in the second cluster 22. The storage module 213 constitutes a storage system together with storage modules of the other clusters. This storage system provides fast and robust storage. For example, a hash of data input from the outside is calculated, and the input data and the hash are stored in one or more storage modules. The storage module 213 includes at least a processor and a storage device.

The first management module 214 includes an operating system (hereinafter, referred to as an "OS"), software that operates on the OS, and software that operates independently of the OS. A failure monitoring unit 42 and a failover control unit 43 are realized by software that operates on the OS, and a recovery unit 44 is realized by software that operates independently of the OS. The first management module 214 includes at least a processor and a storage device. To prevent the performance of the storage module 213 from being degraded due to the operation of the first management module 214, the first management module 214 and the storage module 213 do not share resources. At least the processor included in the first management module 214 and the processor included in the storage module 213 are physically different processors.

The first management module 214 includes a management table 41, the failure monitoring unit 42, the failover control unit 43, and the recovery unit 44. The management table 41 is information stored in the storage device. When the management table 41 is rewritten by any one of the management modules, the rewritten information is transmitted to the other management modules. Therefore, in the present embodiment, all the management modules are assumed to have the same management table 41.

The failure monitoring unit 42 monitors all clusters in the same node and detects the occurrence of a failure. The failure monitoring unit 42 is realized by, for example, the processor included in the first management module 214 that expands a program stored in a ROM (not illustrated) onto a RAM (not illustrated) and executes the program. The failure monitoring unit 42 can use various known methods for monitoring. For example, the failure monitoring unit 42 communicates with another management module at regular time intervals and determines that a failure has occurred when there is no response within a predetermined time period.

The failover control unit 43 switches the representative management module. That is, the failover control unit 43 switches a non-representative management module to a representative management module. The failover control unit 43 does not operate independently, but the failover control units 43 of a plurality of management modules operate in cooperation with each other as described below. In addition, when the failure monitoring unit 42 in the same management module detects a failure in a non-representative management module, the failover control unit 43 issues an OS recovery command to the management module in which the failure has been detected.

The recovery unit 44 is software that operates independently of the OS of the management module. The recovery unit 44 starts operating when the OS recovery command is issued from the outside. The recovery unit 44 performs recovery processing for restoring the initial state of the OS of the management module and the software that realizes the failure monitoring unit 42 and the failover control unit 43 by developing an OS image stored in a storage unit (not illustrated). Further, the recovery unit 44 performs configuration setting of the OS and software by using the system configuration information received after the OS recovery command.

While the management modules included in the respective clusters have no difference in executable functions, only one specific management module serves as the representative management module that has overall control of the storage system at each timing. Hereinafter, a management module other than the representative management module is referred to as a "non-representative management module" for convenience. As will be described below, since the representative management module can be changed, it is not fixed which management module is to serve as a representative management module or a non-representative management module.

The representative management module is a management module in which a built-in representative function is activated and controls the storage system when receiving an operation command from the outside. In the present embodiment, since the representative management module receives the operation command from the outside by performing communication, a predetermined special value is used as an identifier, for example, an IP address of the representative management module in communication. However, the term "special" used herein does not mean a special property of the IP address such as a broadcast address but merely means "special" in terms of being predetermined or known as an identifier of a representative management module. The overall control of the storage system by the representative management module may include various known forms. For example, the representative management module changes the configuration of the storage system based on an operation command from the outside.

Since the representative management module has overall control of the storage system, if the representative management module stops operating, a problem occurs in the operation of the storage system. Thus, in the cluster system 1, when a failure occurs in the representative management module, failover processing is automatically performed. In this failover processing, a non-representative management module at the timing of the detection of the failure in the representative management module is switched to the representative management module. Therefore, even when a failure occurs in the representative management module, the storage system can continue to operate without manual intervention in the cluster system 1.

In the individual clusters, one of the management modules is set as a master management module, and another one of the management modules is set as a standby management module. There is no difference in hardware configuration between the master management module and the standby management module. In the present embodiment, the difference between the master management module and the standby management module is whether or not the management module can be a representative management module. As will be described below, the master management module and the standby management module are interchangeable.

The plurality of storage modules included in the cluster system 1 may be classified into a "controlling storage module" that provides an operation instruction to the other storage modules and a "non-controlling storage module" that receives an instruction from the controlling storage module. In this case, the controlling storage module and the master management module may be included in the same cluster, or the controlling storage module and the master management module may be included in different clusters.

When a failure occurs in any one of the storage modules, the management module included in the same cluster may restore the storage module having the failure, or the management module or the storage module included in a different cluster may restore the storage module having the failure.

Figure 2:
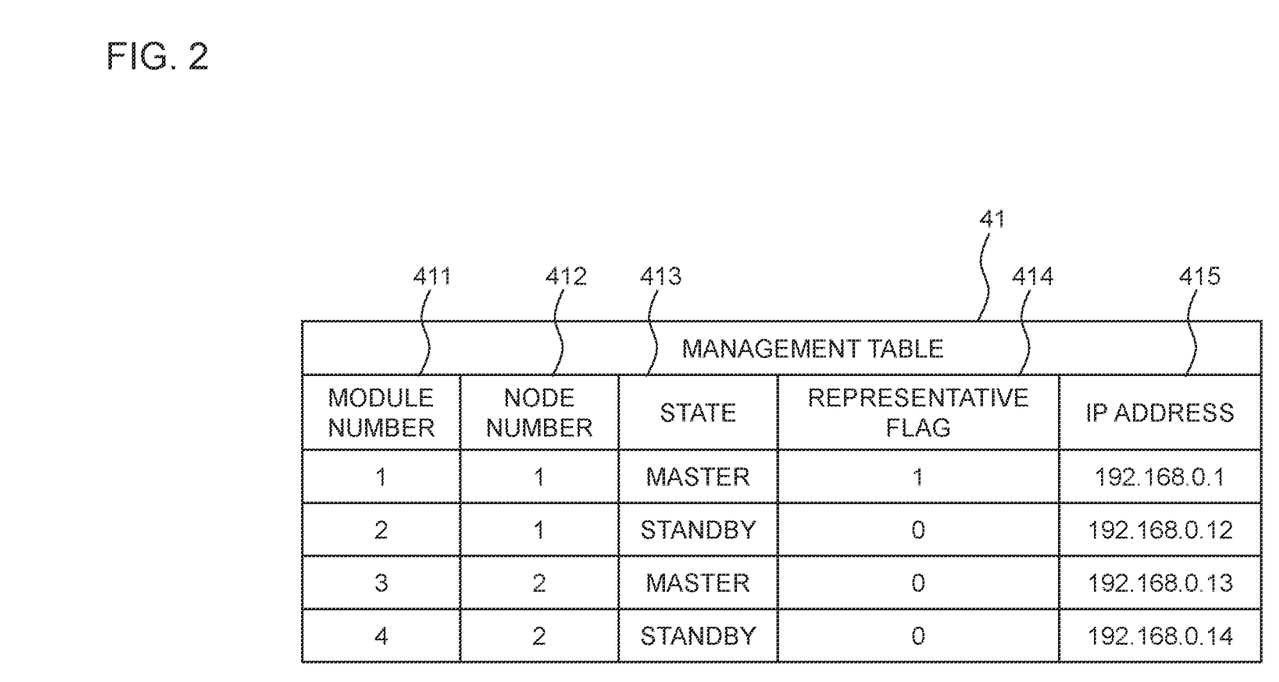
FIG. 2 illustrates an example of a management table.

FIG. 2 illustrates an example of the management table 41. The management table 41 stores information about the individual module, specifically, a combination of a number of the node in which the module is stored, whether the module is a master module or standby module, whether or not the module is a representative module, and the IP address of the module. The management table 41 includes a plurality of records, and each record has fields of a module number 411, a node number 412, a state 413, a representative flag 414, and an IP address 415. The module number 411 includes a number of a management module. The node number 412 includes a number of the node to which the management module belongs. The state 413 represents a state of the management module, which is, for example, "master", "standby", or "stopped". The representative flag 414 includes "1" representing a representative management module and "0" representing a non-representative management module.

The IP address 415 is an external IP address of the management module. For example, the uppermost row in the example illustrated in FIG. 2 indicates that the first management module 214 whose module number is "1" belongs to the first node 11, is a master and representative management module, and has an IP address of "192.168.0.1" on the side coupled to the first coupling unit 2 in the port 211. The IP addresses of the management modules are classified into a special IP address assigned to the representative management module and normal IP addresses other than the special IP address. In other words, the IP address of the representative management module is set to a predetermined special IP address, which is "192.168.0.1" in the present embodiment.

When the representative management module is changed, in other words, when a certain management module serving as the representative management module is changed to a non-representative management module, the IP address of the management module is changed from the above-described special IP address to a non-special IP address. This non-special IP address is determined in advance, for example, for each management module. In this case, for example, the IP address of the first management module 214 is set as "192.168.0.1" or "192.168.0.11", and the IP address of the second management module 224 is set as "192.168.0.1" or "192.168.0.12". The IP address of the third management module 234 is set as "192.168.0.1" or "192.168.0.13", and the IP address of the fourth management module 244 is set as "192.168.0.1" or "192.168.0.14".

Figure 3:
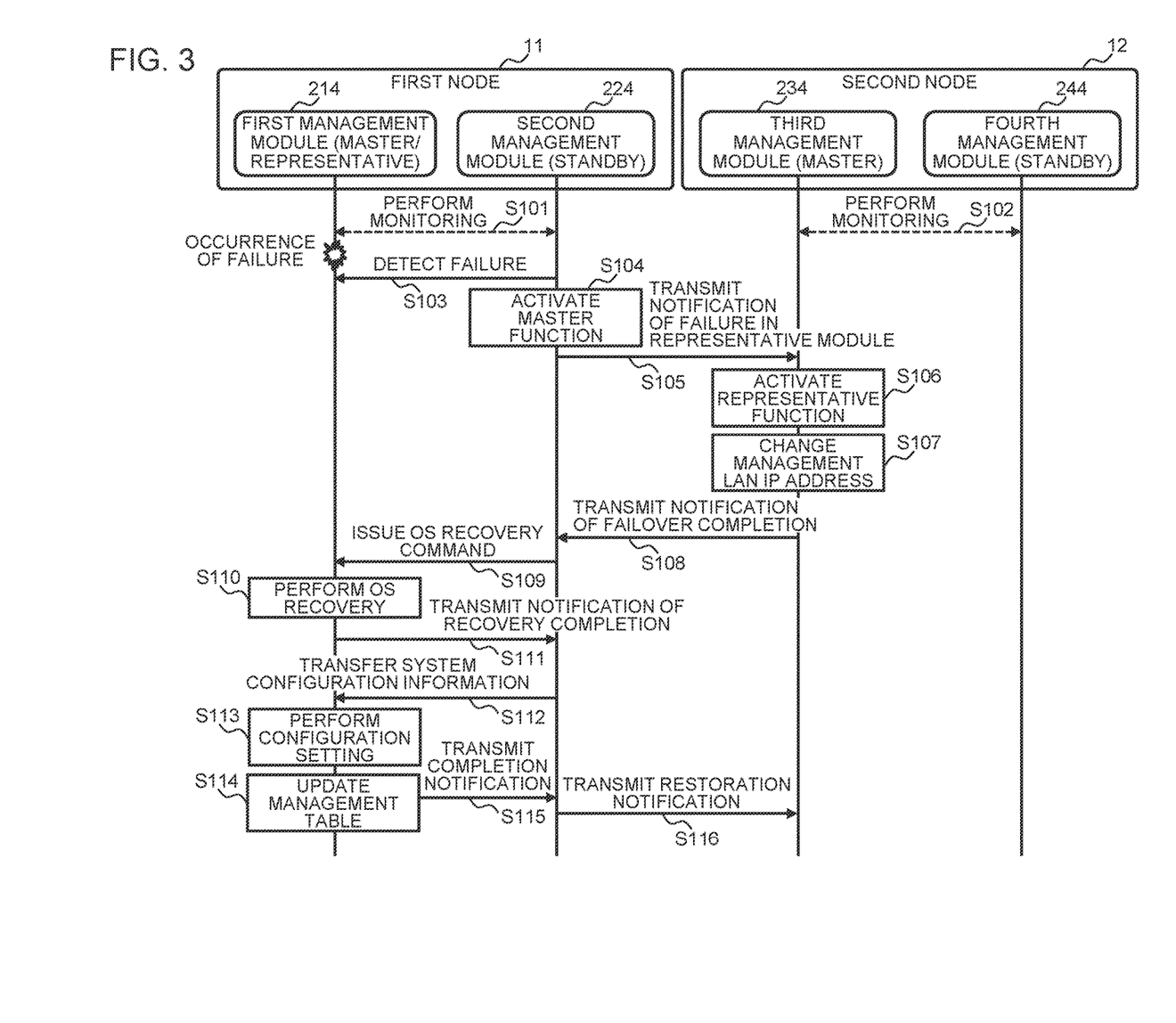
FIG. 3 is a time chart illustrating an outline of processing performed when a failure occurs in a representative module.

FIG. 3 is a time chart illustrating an outline of processing performed when a failure occurs in the representative module. In FIG. 3, time elapses from the upper side to the lower side of the drawing. The first management module 214 and the second management module 224 monitor each other (S101), and the third management module 234 and the fourth management module 244 monitor each other (S102). When a failure occurs in the first management module 214, the second management module 224 detects the failure (S103), and the second management module 224 starts operating as a master management module of the first node 11 (S104). The second management module 224 that has detected the failure further notifies a master management module of another node, that is, the third management module 234, of the occurrence of the failure in the representative module (S105). The third management module 234 that has received the notification of occurrence of failure activates the representative function (S106) and changes the IP address (S107). The IP address to be changed is an external IP address. Next, the third management module 234 transmits a notification that the failover of the representative module has been completed (S108) to the second management module 224.

The second management module 224 that has received the notification of failover completion issues an OS recovery command to the first management module 214 in which the failure has occurred (S109). The first management module 214 that has received the OS recovery command performs OS recovery (S110) and transmits a notification that the recovery has been completed to the second management module 224 (S111). The second management module 224 that has received the notification of recovery completion transfers system configuration information to the first management module 214 (S112). The first management module 214 that has received the system configuration information performs configuration setting (S113) and completes the setting by changing the state of the first management module 214 in the management table 41 to "standby" (S114). Finally, the first management module 214 transmits a completion notification to the second management module 224 (S115). The second management module 224 that has received the completion notification transmits a notification that the first management module 214 has been restored to the third management module 234 that is a new representative module (S116). The third management module 234 that has received the restoration notification distributes the rewritten management table 41 to the other management modules and ends the processing illustrated in FIG. 3.

Figure 4:
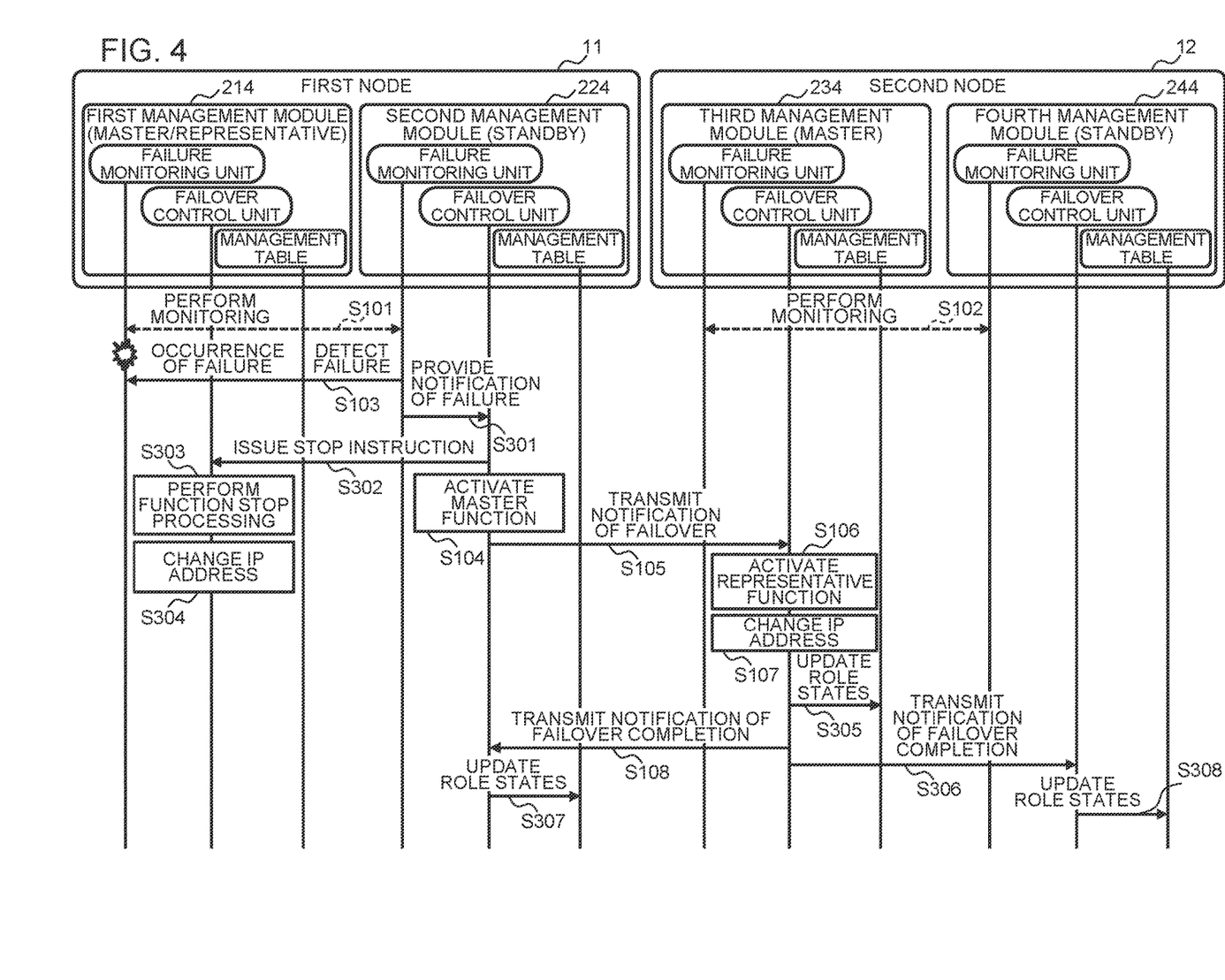
FIG. 4 is a time chart illustrating detailed processing performed when a failure occurs in a representative module.
Figure 5:
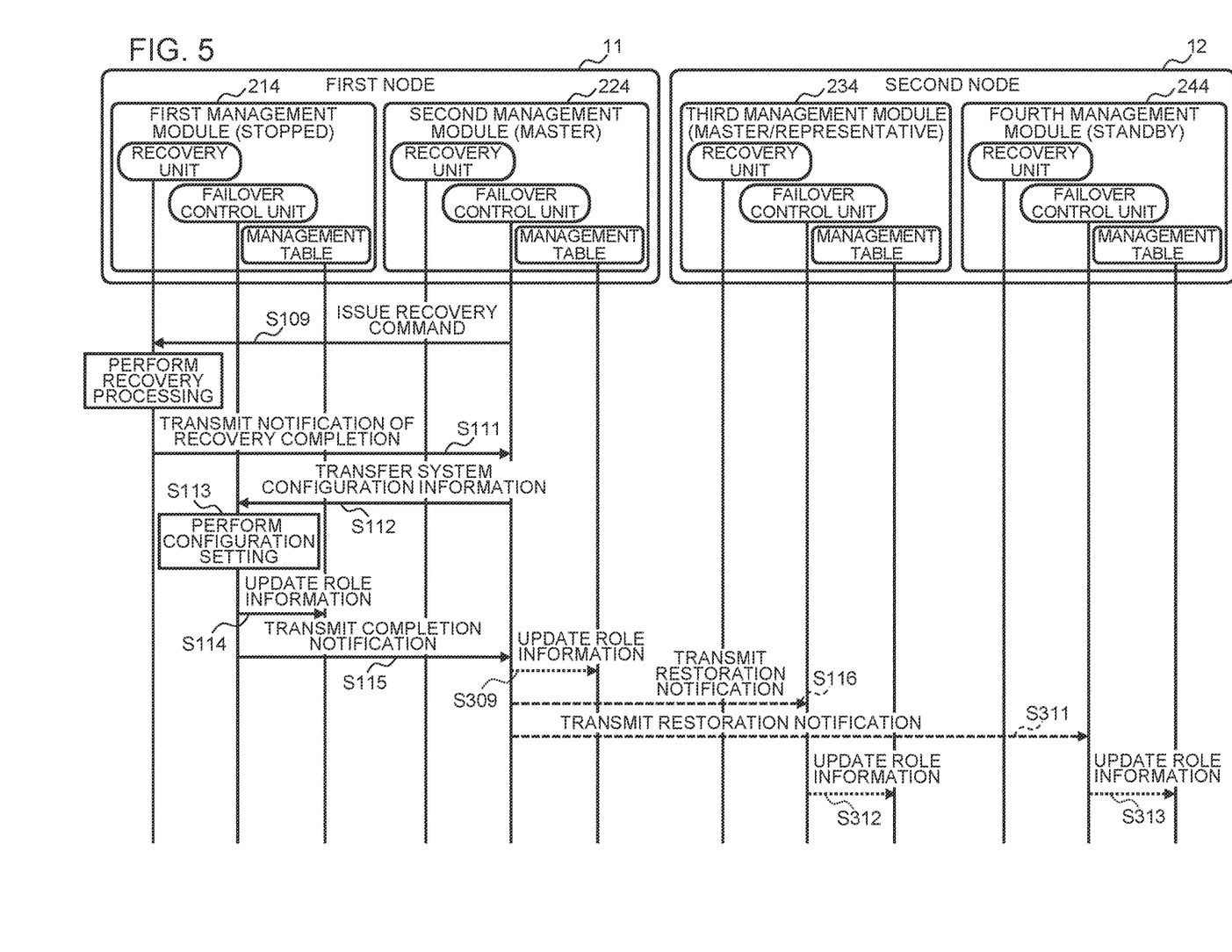
FIG. 5 is a time charts illustrating detailed processing performed when a failure occurs in a representative module.

FIGS. 4 and 5 are time charts illustrating detailed processing performed when a failure has occurred in the representative module. In other words, FIGS. 4 and 5 illustrate a detail of FIG. 3. In each of FIGS. 4 and 5, time elapses from the upper side to the lower side of the drawing, and the uppermost portion in FIG. 5 illustrates the time point subsequent to the time point illustrated in the lowermost portion in FIG. 4. FIGS. 4 and 5 illustrate operations and changes of the recovery unit 44, the failover control unit 43, and the management table 41 included in each management module. In the following description, the same processes as those illustrated in FIG. 3 are denoted by the same step numbers, and processes unique to FIGS. 4 and 5 are denoted by new step numbers and described.

First, in steps S101 and S102, the failure monitoring units 42 in the respective management modules mutually monitor the management modules. In the following step S103, the failure monitoring unit 42 of the second management module 224 detects a failure in the first management module 214. Next, the failure monitoring unit 42 of the second management module 224 notifies the failover control unit 43 of the same second management module 224 of the occurrence of the failure (S301). The failover control unit 43 of the second management module 224 issues a stop instruction to the failover control unit 43 of the first management module 214 in which the failure has been detected (S302), and the failover control unit 43 of the first management module 214 that has received the stop instruction performs processing for stopping the function of the first management module 214 (S303) and performs processing for changing the IP address of the first management module 214 (S304). In this IP address change processing, the external IP address of the first management module 214 is changed from the special IP address for the representative, for example, "192.168.0.1" to a non-special IP address, for example, "192.168.0.11".

After issuing the stop instruction to the first management module 214 as described above (S302), the failover control unit 43 of the second management module 224 activates the master function (S104) and transmits a notification of failover to the failover control unit 43 of the third management module 234 (S105). The failover control unit 43 of the third management module 234 that has received the notification of failover activates the representative function (S106) and performs processing for changing the IP address of the third management module 234 (S107). In this IP address change processing, the external IP address of the third management module 234 is changed from the non-special IP address, for example, "192.168.0.13" to a special IP address for the representative, for example, "192.168.0.1".

Next, the failover control unit 43 updates the role states, that is, rewrites the management table 41 (S305). Specifically, the failover control unit 43 changes a representative flag from the first management module 214 to the third management module 234, changes the IP addresses of the first management module 214 and the third management module 234, changes the state of the first management module 214 to "stopped", and changes the state of the second management module 224 to "master". Next, the failover control unit 43 of the third management module 234 transmits a notification of failover completion to the second management module 224 (S108) and also transmits a notification of failover completion to the fourth management module 244 (S306).

The failover control unit 43 of the second management module 224 that has received the notification of failover completion updates the role states, that is, updates the management table 41 in a similar manner to the update in the third management module 234 (S307). The failover control unit 43 of the fourth management module 244 that has received the failover completion notification updates the role states, that is, updates the management table 41 in a similar manner to the update in the third management module 234 (S308). The second management module 224 and the fourth management module 244 assume that the transmission source of the notification of failover completion is the new representative management module and updates the management table 41. The description continues with reference to FIG. 5.

Next, the failover control unit 43 of the second management module 224 issues an OS recovery command to the first management module 214 in which the failure has occurred (S109). The recovery unit 44 of the first management module 214 that has received the OS recovery command performs OS recovery (S110) and transmits a notification that the recovery has been completed to the second management module 224 (S111). The second management module 224 that has received the notification of recovery completion transfers system configuration information to the first management module 214 (S112). The first management module 214 that has received the system configuration information performs configuration setting (S113) and updates role information, that is, changes the state of the first management module 214 in the management table 41 to "standby" (S114). Finally, the first management module 214 transmits a completion notification to the second management module 224 (S115).

The failover control unit 43 of the second management module 224 that has received the completion notification transmits a notification that the first management module 214 has been restored to each of the third management module 234 and the fourth management module 244 (S116, S311). The failover control unit 43 of the third management module 234 that has received the restoration notification updates role information, that is, changes the state of the first management module 214 in the management table 41 to "standby" (S312). The failover control unit 43 of the fourth management module 244 also updates role information, that is, changes the state of the first management module 214 in the management table 41 to "standby" (S313) and ends the processing illustrated in FIGS. 4 and 5.

Figure 6:
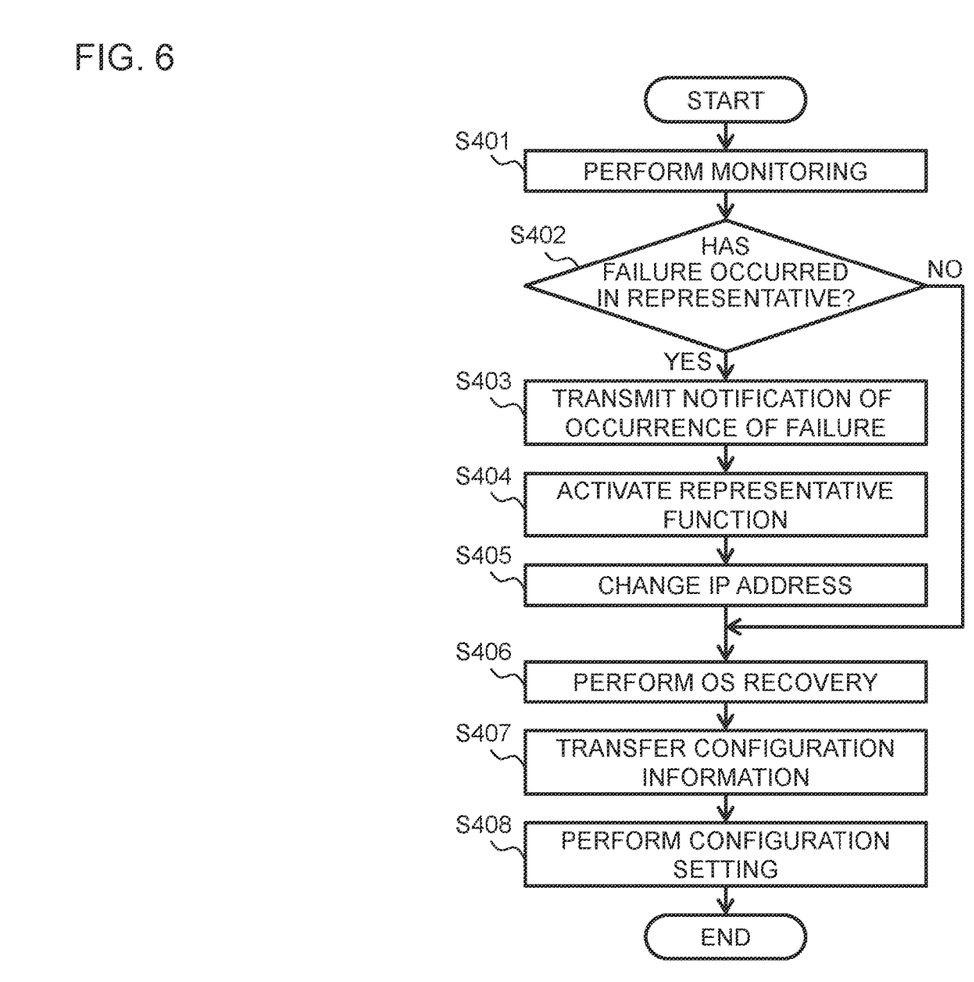
FIG. 6 is a flowchart illustrating processing performed when a failure is detected in the cluster system.

FIG. 6 is a flowchart illustrating processing performed when a failure has been detected in the cluster system 1. The processing of each step will be described together with the correlation with the steps in FIG. 3 described above. First, in step S401, the failure monitoring unit 42 of each management module performs monitoring to detect a failure. If no failure is detected by any of the failure monitoring units 42, the processing remains in step S402. Step S401 corresponds to steps S101 to S103 in FIG. 3. In the following step S402, the failure monitoring unit 42 that has detected the failure determines whether the failure has occurred in the representative management module. If the failure monitoring unit 42 determines that the failure has occurred in the representative management module, the processing proceeds to step S403. If the failure monitoring unit 42 determines that the failure has occurred in a management module other than the representative management module, the processing proceeds to step S406.

In step S403, the failure monitoring unit 42 that has detected the failure refers to the management table 41 and notifies a master management module in another node of the occurrence of the failure. This step corresponds to step S105 in FIG. 3. In the following step S404, the management module that has received the notification in step S403 activates a representative function and changes its IP address in the following step S405, and the processing proceeds to step S406. The processing of steps S404 and S405 correspond to the processing of steps S106 and S107 in FIG. 3.

In step S406, the failover control unit 43 in the same management module as that including the failure monitoring unit 42 that has detected the failure issues an OS recovery command so that the recovery unit 44 in the management module in which the failure has occurred performs OS recovery processing. This step corresponds to step S110 in FIG. 3. In the following step S407, the failover control unit 43 in the same management module as that including the failure monitoring unit 42 that has detected the failure transfers configuration information to the management module in which the failure has occurred. This step corresponds to step S112 in FIG. 3. In the following step S408, the recovery unit 44 of the management module in which the failure has occurred performs configuration setting by using the received configuration information, and the processing illustrated in FIG. 6 ends. This step corresponds to S114 in FIG. 3.

Note that after the processing illustrated in FIG. 6 is completed by completing step S408, the processing is started again from step S401. The processing of steps S403 to S405 can be referred to as "failover processing", and the processing of steps S406 to S408 can be referred to as "automatic restoration processing".

According to Embodiment 1 described above, the following effects can be obtained.

(1) The cluster system 1 includes a plurality of nodes, that is, the first node 11 and the second node 12. Each of the nodes includes a plurality of clusters. Each of the clusters includes a management module managing the cluster system 1 and a storage module constituting a storage system. Among all the management modules included in the cluster system 1, one of the management modules is set as a representative management module. In the individual clusters, one of the management modules is set as a master management module, and another one of the management modules is set as a standby management module. Since two clusters are included per node in the present embodiment, in a state where no failure has occurred in any management module, one master management module and one standby management module are set in each node. Each of the management modules includes a failure monitoring unit 42 that monitors occurrence of a failure in another management module, a failover control unit 43 that sets, when any failure monitoring unit 42 detects a failure in the representative management module, any one of the non-representative management modules as a new representative management module, and a recovery unit 44 that restores the failure monitoring unit and the failover control unit in the management module in which the failure has been detected by any failure monitoring unit. Thus, when a failure occurs in a management module, the management module can be restored without manual intervention.

For example, by separately providing an overall management apparatus that is coupled to a plurality of nodes via a network and that has overall control of the management modules, the restoration can also be performed without manual intervention when a failure occurs in any one of the management modules. However, in this case, in addition to the hardware configuring each node, the overall management apparatus, which is another piece of hardware, is further needed. Therefore, there is a demerit in terms of hardware cost, installation cost, and operation cost. In contrast, according to the present embodiment, since a management module restores another management module in the cluster, there is no such demerit.

(2) An identifier for communication is set for each of the management modules. A predetermined special identifier, for example, "192.168.0.1" is set as the IP address for the representative management module. The failover control unit 43 sets the above-described special identifier for a new representative management module. Thus, even when the representative management module is changed, the management module can receive instructions as a storage system from the outside.

(3) The management module and the storage module are realized by different physical processors. Thus, when the processing of the management module increases due to recovery processing or the like, the storage system is not affected.

(4) The failure monitoring unit 42 monitors another management module in the same node. When detecting a failure in the representative management module, as illustrated in FIG. 4, the failure monitoring unit 42 transmits a notification to the failover control unit 43 of a master management module in a different node so as to cause the master management module to be a new representative management module. In this way, the new representative management module can be determined based on the information in the management table 41.

(5) Each of the management modules has an operating system. The failover control unit 43 and the failure monitoring unit 42 operate on the operating system, and the recovery unit 44 operates independently of the operating system. The recovery unit 44 restores the operating system of the management module in the same cluster. Thus, the failover control unit 43 and the failure monitoring unit 42 can be created and debugged by using a high-level language that operates on the OS, and this facilitates development.

Variation 1

In the above embodiment, the failover control unit 43 operating in the second management module 224 that has detected a failure transmits a restoration notification to each of the third management module 234 and the fourth management module 244, and in response to this notification, the third management module 234 and the fourth management module 244 each update the management table 41. However, instead of transmitting the notification to the fourth management module 244, the failover control unit 43 of the second management module 224 may cause the third management module 234 to transmit the notification to the fourth management module 244.

Variation 2

In the above embodiment, the second management module 224 that has detected a failure refers to the management table 41 and transmits a notification to a master management module in another node, that is, the third management module 234, and the third management module 234 that has received the notification becomes a new representative management module. However, the management module that has detected the failure may become a new representative management module. In addition, when the cluster system 1 includes three or more nodes, a priority order may be determined in advance for each node, and the management module that has detected a failure may notify a management module in an operating node having the highest priority of the failure so that the notified management module becomes a new representative management module.

Variation 3

In the above embodiment, an example in which IP addresses are used as identifiers for communication has been described. However, the identifiers for communication are not limited to the IP addresses. Various known identifiers such as MAC addresses can be used. In addition, use of the Internet protocol for communication is not essential. Instead, a communication protocol such as Controller Area Network (CAN) (registered trademark), Local Interconnect Network (LIN), or FlexRay may be used.

Variation 4

In the above embodiment, the management module and the storage module are realized by different physical processors. However, the management module and the storage module may be realized by the same physical processor. In addition, the management module may have no OS, and at least one of the failure monitoring unit 42, the failover control unit 43, and the recovery unit 44 may be realized by a rewritable logic circuit, for example, a field programmable gate array (FPGA). When any one of the failure monitoring unit 42 and the failover control unit 43 is realized by an FPGA, the recovery unit 44 restores the failure monitoring unit 42 and the failover control unit 43 by writing configuration information from a storage unit (not illustrated) in the FPGA.

Variation 5

In the above embodiment, each cluster includes the management module and the storage module. However, instead of the storage module, each cluster may include an arithmetic module that performs a predetermined arithmetic operation. While performing the arithmetic operation is a necessary condition for the arithmetic module, including a non-volatile storage device is not a necessary configuration for the arithmetic module. Note that the storage module is also regarded as a type of arithmetic module.

In each of the above embodiment and variations, the configuration of the functional block is merely an example. Some functional configurations illustrated as separate functional blocks may be integrated, or the configuration illustrated in one functional block diagram may be divided into two or more functions. Further, some of the functions of each functional block may be included in another functional block.

The variations described above may be combined with each other. Although various embodiments and variations have been described above, the present invention is not limited to these contents. Other embodiments conceivable within the scope of the technical idea of the present invention are also included within the scope of the present invention.

What is claimed is:

1. A cluster system including a plurality of nodes, the cluster system comprising:
a plurality of clusters included in each of the nodes,
wherein each cluster includes a management module managing the cluster system and an arithmetic module constituting an arithmetic system,
wherein, among all the management modules included in the cluster system, one of the management modules is set as a representative management module,
wherein in individual clusters of the plurality of clusters, one of the management modules is set as a master management module, and another one of the management modules is set as a standby management module, and
wherein each of the management modules includes:
a failure monitoring unit that monitors an occurrence of a failure in another management module;
a failover control unit that sets, when a failure in the representative management module is detected by any of the failure monitoring units, any of the management modules among non-representative management modules, which are management modules excluding the representative management module among all the management modules, as a new representative management module; and
a recovery unit that restores the failure monitoring unit and the failover control unit in the management module in which a failure is detected by any of the failure monitoring units.

2. The cluster system according to claim 1,
wherein each of the management modules has an identifier set for communication,
wherein the representative management module has a predetermined special identifier, and
wherein the failover control unit sets the predetermined special identifier for the new representative management module.

3. The cluster system according to claim 1,
wherein the management module and the arithmetic module are realized by different physical processors.

4. The cluster system according to claim 1,
wherein the failure monitoring unit monitors the another management module in an identical node, and
wherein when the failure monitoring unit detects a failure in the representative management module, the failure monitoring unit transmits a notification to the failover control unit in the master management module in another of the nodes to cause the master management module to be a new representative management module.

5. The cluster system according to claim 1,
wherein each of the management modules has an operating system,
wherein the failover control unit and the failure monitoring unit are realized by executable instructions that operate on the operating system, and the recovery unit operates independently of the operating system, and
wherein the recovery unit further restores the operating system.

6. The cluster system according to claim 1,
wherein the arithmetic module includes a storage device and an arithmetic unit that executes an arithmetic operation relating to information recorded in the storage device, and
wherein the arithmetic system is a storage system that records information and reads information.

7. A restoration method performed by a cluster system including a plurality of nodes, the cluster system including a plurality of clusters included in each of the nodes, and each cluster includes a management module managing the cluster system and a storage module constituting an arithmetic system, wherein, among all the management modules included in the cluster system, one of the management modules is set as a representative management module, and wherein in individual clusters of the plurality of clusters, one of the management modules is set as a master management module, and another one of the management modules is set as a standby management module, the restoration method comprising causing each of the management modules to:

perform a failure monitoring process for monitoring an occurrence of a failure in another management module;

perform a failover process for setting, when a failure in the representative management module is detected by the failure monitoring process in any of the management modules, any of the management modules among non-representative management modules, which are management modules excluding the representative management module among all the management modules, as a new representative management module; and perform a recovery process for restoring a program that realizes the failure monitoring process and the failover process in the management module in which a failure is detected by the failure monitoring process in any of the management modules.

* * * * *